United States Patent Office 2,889,219
Patented June 2, 1959

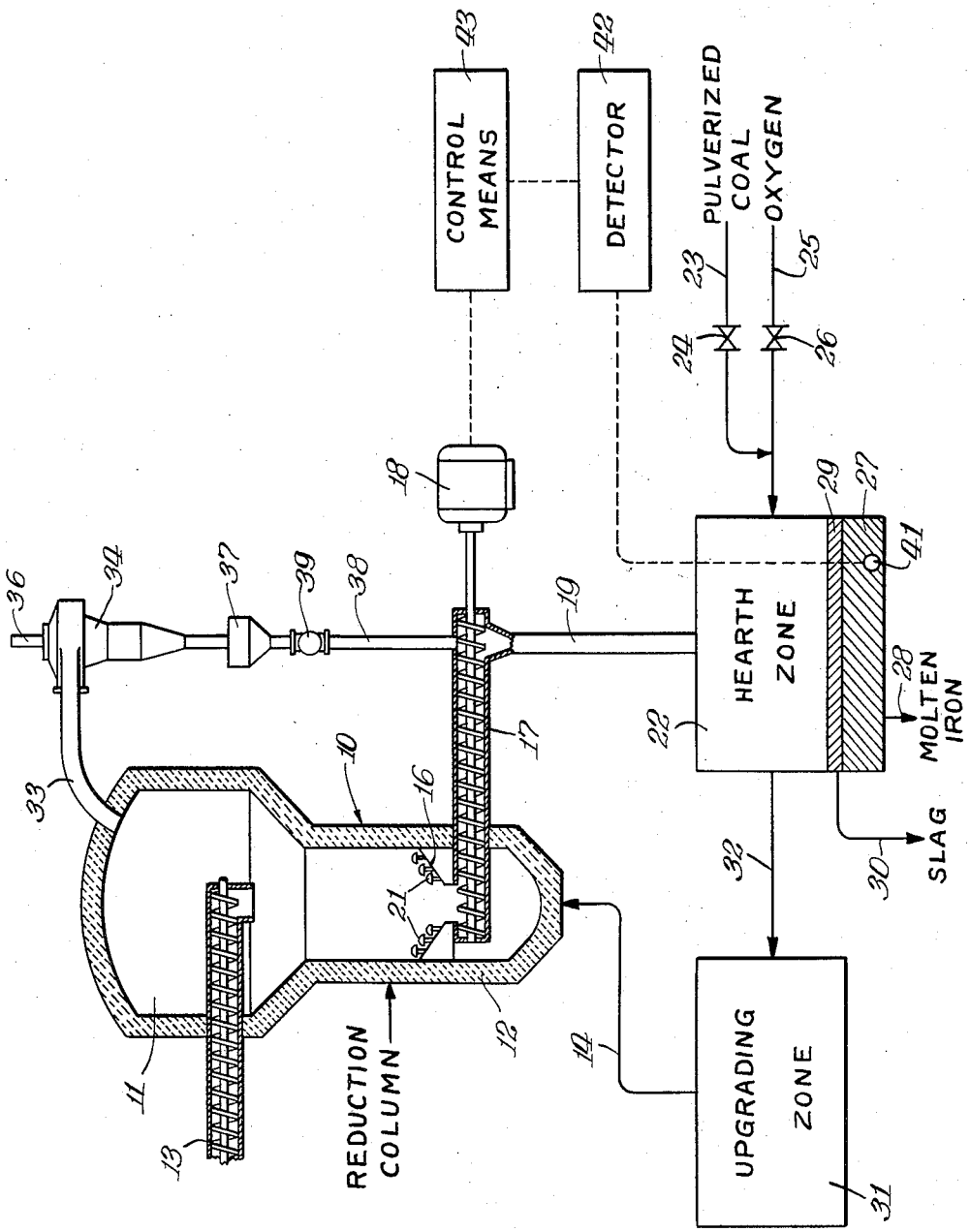

2,889,219

CONTROL METHOD AND APPARATUS FOR IRON ORE REDUCTION PROCESS

James W. Halley, Dune Acres, Ind., assignor to Inland Steel Company, Chicago, Ill., a corporation of Delaware Application December 28, 1956, Serial No. 631,191

8 Claims. (Cl. 75—52)

This invention relates to the direct reduction of iron oxide ores by means of carbon monoxide gas and more particularly to a novel method and apparatus for controlling such a reduction process.

In my copending application Serial No. 737,015, filed May 22, 1958, an integrated smelting process is described and claimed which involves the direct reduction of iron oxide ore by a CO-rich reducing gas and melting of the reduced iron to produce hot metal suitable for use in a steelmaking process. The process as described in detail in my prior application involves three principal process stages: (1) a combined melting and gas generator zone wherein a fuel, preferably pulverized coal, is burned with oxygen in order to melt and separate the iron from the reduced ore and at the same time producing combustion gases, (2) an upgrading or gas enrichment zone wherein the combustion gases from the first zone are treated to increase their reducing capacity, and (3) a reduction zone wherein subdivided iron oxide ore is contacted with the enriched reducing gases from the second zone and from which the resultant reduced iron ore is passed to the first zone. As will hereinafter appear in detail, I have found that the critical control point in such a process is the rate of transfer of iron ore solids from the reduction zone to the melting zone. By regulating the transfer rate in accordance with the principles hereinafter described, my invention provides a simple but highly effective technique for controlling the process so that the thermal requirements and the chemical requirements of the system are always in balance.

Accordingly, a primary object of the invention is to provide a novel and improved control scheme in a process for the direct reduction of iron ore and melting of the reduced iron.

A further object of the invention is to provide novel means for controlling the rate of transfer of iron ore solids from a reduction zone to a melting zone in an integrated iron ore smelting process.

Another object of the invention is to provide a novel control method for an iron ore reduction process which results in maintaining a proper balance between the chemical requirements and the thermal requirements of the system.

An additional object of the invention is to provide a novel combination of apparatus for accomplishing the foregoing objects.

Other objects and advantages of the invention will become apparent from the subsequent detailed description taken in conjunction with the accompanying drawing which is a generally schematic flow sheet for the purposes of illustrating the principles of the invention.

Referring to the drawing, the reduction zone comprises a refractory lined column 10 having an upper portion 11 of relatively enlarged diameter and a lower portion 12 of reduced diameter. Subdivided or granular iron oxide ore is fed into the enlarged upper section 11 through a screw conveyor mechanism 13 from a supply source or ore preheating source (not shown), and CO-rich reducing gases are introduced through a line 14 to the bottom of the reduction column 10. The ore which may be used in the process comprises any of the well known iron oxide ores including hematite, magnetite and others which may contain at least about 5 wt. percent and as much as 45 wt. percent gangue materials, particularly silica and alumina. Other ores similar to iron ore such as iron-manganese ores may also be used.

Although in its broadest scope the invention contemplates any suitable means of contacting subdivided iron oxide ore with the reducing gases in the reduction column 10, it is preferred to utilize a countercurrent non-fluidized moving bed operation wherein the column of ore solids moves downwardly in countercurrent contact with the upwardly flowing reducing gases, the fluid velocity of the upwardly flowing gases being maintained below the threshold velocity for fluidization of the ore particles and preferably not in excess of about 80% of the required velocity for fluidization. Merely by way of illustration, in the apparatus shown schematically in Fig. 1 the downwardly flowing bed or ore solids is supported at its lower end by a cone-shaped partition 16 which communicates with one end of another screw conveyor 17 operated by a motor 18 for discharging the reduced ore solids from the reduction column 10 to a hearth feed line 19. The partition 16 is provided with suitable protected gas passages, such as the bubble cap element 21, whereby the reducing gas introduced through the line 14 at the bottom of the column 10 may pass upwardly through the partition 16 and thence in countercurrent relation with the downwardly moving bed of ore particles.

In the reduction column 10 the well known reduction reactions of iron oxide with CO (and $H_2$) take place with the heat of reaction being supplied by the sensible heat of the reducing gases at a temperature of from about 900° F. to about 1800° F. The resultant ore solids, comprising reduced iron, gangue, and a certain amount of unreduced iron oxide, pass through the hearth feed line 19 to a hearth zone illustrated diagrammatically at 22. The hearth zone 22 comprises a combined melting and gas generator zone wherein a suitable fuel is burned with a high oxygen content gas. Preferably, the fuel comprises a solid carbonaceous material such as anthracite, bituminous, or sub-bituminous coal. As shown by way of illustration in the drawing, the fuel comprises pulverized coal introduced through a line 23 having a flow controller or regulator 24, and the pulverized coal is premixed with an oxygen-rich gas introduced through a line 25 having a flow control valve 26. The oxygen-rich gas introduced with the coal must contain at least 85% oxygen, e.g. a commercial grade of straight oxygen which may be 98–99% pure, or oxygen enriched air. In order to supply the thermal requirements of the melting operation, the relative quantities of coal and oxygen and the other combustion conditions in the hearth zone 22 are regulated so that the $CO_2:CO$ ratio in the exit combustion gases is at least about 1 with the result that the gases in the hearth zone are oxidizing to iron. In this way, a temperature of from about 2900° F. to about 3500° F. is obtained in the hearth zone so that the heat of combustion is sufficient to insure melting of the iron in the reduced ore particles thereby separating the same from the gangue of the ore. Molten iron, indicated at 27, is removed from the hearth zone 22 through a line 28, and a fluid slag 29 formed from the ash in the coal and the gangue in the ore is removed through a line 30.

Since the combustion gases produced in the hearth zone 22 contain an excess of $CO_2$, they must be subjected to an uprgrading or enrichment treatment before they can be used for ore reduction purposes. Preferably, the upgrading or enrichment of the combustion gases is effected by reducing the $CO_2$ content by reaction with carbon. For example, as described in detail in my aforementioned copending application Serial No. 737,015, the $CO_2$-rich combustion gases from the hearth zone may be supplied to a gasifier zone to which oxygen and an excess of coal are also supplied. The carbon in part of the coal supplied to the gasifier zone reacts with the $CO_2$ in the combustion gases and the endothermic heat requirements for the reduction reaction are furnished by the sensible heat in the combustion gases supplemented by additional heat evolved in the gasifier zone by combustion of another part of the coal with oxygen. Although reaction of $CO_2$ with carbon to produce $CO$ is the primary reduction reaction accomplished in such a gasifier zone, it will also be appreciated that water vapor contained in the combustion gases will be reduced by reaction with carbon to form $H_2$. For purposes of the present invention, the details of the gas enrichment or upgrading step are unimportant and this phase of the process is illustrated merely schematically in the drawing by an upgrading zone 31 to which the $CO_2$-rich combustion gases from the hearth zone 22 are fed through a line 32.

For best results, it is desirable that the $CO_2$ content of the combustion gases introduced to the upgrading zone 31 be decreased to the extent that the exit reducing gases removed through the line 14 contain not more than about 10% $CO_2$ with a $CO:CO_2$ ratio of at least about 7, and preferably not more than about 5% $CO_2$ with a $CO:CO_2$ ratio of at least about 10, in order to provide the necessary reducing capacity for the efficient direct reduction of iron oxide ore in the reduction column 10. Of course, it is to be understood that various intermediate steps for the treatment of the CO-rich reducing gases from the upgrading zone 31 may be necessary prior to introduction of these gases into the reduction column 10. For example, it may be necessary to subject the gases to a cleaning or scrubbing operation for the removal of entrained ash particles. Also, as an incident to the removal of ash, it may be necessary to cool and reheat the CO-rich reducing gases, as described in my aforementioned copending application Serial No. 737,015. In any event, the CO-rich reducing gases as introduced to the reduction column 10 should have a temperature within the range of from about 900° F. to about 1800° F.

The depleted or "spent" reducing gases pass from the top of the reduction column 10 through a line 33 to a cyclone separator 34 or like device wherein entrained fine ore particles are removed. The off gases are discharged through a line 36 and the ore fines are collected in a hopper or storage vessel 37 which is connected by a line 38 and a valve 39 to the discharge end of the screw conveyor 17 whereby the ore fines may be charged in any desired intermittent or continuous manner through the hearth feed line 19 to the hearth zone 22.

Although the combustion atmosphere in the hearth zone 22 is oxidizing to iron for the reasons discussed above, the molten iron 27 is protected against reoxidation by means of the overlying slag blanket 29. However, excessive reoxidation of the molten iron 27 is also retarded by the presence of extraneous carbon or carbonaceous material introduced into the hearth zone 22 for reaction with unreduced iron oxide or FeO contained in the ore solids supplied through the hearth feed line 19. In other words, under practical operating conditions complete reduction of the iron oxide contained in the ore fed to the reduction column 10 is never realized with the result that the ore solids discharged through the line 19 to the hearth zone 22 contain a significant amount of unreduced iron oxide or FeO. In order to accomplish further, and in most cases substantially complete, reduction of iron oxide it is an important feature of the process that extraneous carbon or carbonaceous material be present in the hearth zone 22 for reaction with the unreduced iron oxide or FeO supplied to the hearth zone in the ore solids. Carbon in the form of coke, coal, graphite or the like may be separately introduced into the hearth zone 22 in an amount sufficient to complete or substantially complete the reduction of the residual iron oxide carried into the hearth zone and also to carburize the molten iron to the usual pig iron or hot metal level of from about 2 wt. percent to about 4 wt. percent. Also, the introduction of extraneous carbon to the hearth zone 22 for this purpose may be accomplished by control of the coal-oxygen combustion devices in the hearth zone so that there is a certain amount of fall-out or deposition of excess unburned coal in the hearth zone 22. This fall-out of coal is rapidly assimilated in the liquid slag-metal system and under the high temperature conditions in the hearth zone the desired further reduction of iron oxide and carburization of the molten iron are easily effected. As will readily be understood, the effect of the coal fall-out or other introduction of extraneous carbon to the hearth zone 22 supplements the protective action of the supernatant slag blanket 29 so as to further retard and minimize undesired reoxidation of the molten iron 27.

As is explained in my copending application Serial No. 630,195, the extent to which reduction of iron oxide is carried out in the reduction column 10 and the extent to which reduction of residual iron oxide is completed in the hearth zone 22 are important factors which must be balanced against other considerations in order to obtain an economic operation. Generally speaking, I have found that the most favorable economic balance is achieved by restricting the extent of reduction in the column 10 so that the reduced iron ore solids which are fed to the hearth zone 22 through the line 19 contain at least about 5 wt. percent unreduced iron oxide or FeO, but in no case should the amount of unreduced iron oxide or FeO be in excess of about 35 wt. percent. In other words, the reduction column 10 should be operated so that from about 65 wt. percent to about 95 wt. percent of the iron oxide in the ore is reduced to iron and preferably from about 75% to about 90% reduction is realized. Thus, the solids fed through the line 19 to the hearth zone 22 may contain from about 5 to about 35 wt. percent, and preferably from about 10 to about 25 wt. percent, unreduced iron oxide or FeO.

From an operating viewpoint, the critical control point of the process as thus far described is the rate of transfer of ore solids from the reduction column 10 to the hearth zone 22. As will be apparent, the thermal requirements at the hearth zone 22 are determined by (1) the amount of reduced iron which is fed to the hearth and must be melted therein, and (2) the amount of unreduced FeO which is fed to the hearth and must be reduced by endothermic reaction with carbon. Consequently, the thermal requirements of the hearth zone 22 may vary to a substantial extent dependent upon the relative proportion of reduced iron and unreduced FeO contained in the solids charged to the hearth. For example, if the solids transferred to the hearth zone contain a relatively high proportion of unreduced FeO because of insufficient reaction time in the reduction column 10 or for other reasons, a relatively large quantity of additional heat must be provided in the hearth zone 22 in order to supply the endothermic heat requirements for the reduction of FeO with added carbon. On the other hand, if the material charged to the hearth zone contains only a relatively minor proportion of unreduced FeO, the thermal requirements at the hearth are considerably decreased because melting of the reduced iron is the principal effect being obtained in the hearth under such conditions.

With the foregoing considerations in mind, it will be apparent that the rate of passage of ore particles through the reduction column 10 and the rate of transfer of the solids to the hearth zone 22 must be properly controlled if the process is to operate smoothly with the chemical requirements and the thermal requirements of the system in balance. In accordance with the present invention, the desired control is obtained by maintaining a substantially constant heat input to the hearth zone 22 with a substantially constant gas production rate and a substantially constant rate of introduction of reducing gases to the reduction column. A temperature sensing element such as a thermocouple 41 is located in the hearth zone 22 so as to respond to the temperature of the metal 27, and by means of an interconnected detector device and control system indicated schematically at 42 and 43, respectively, the operation of the motor 18 which drives the screw conveyor 17 is controlled to maintain a substantially constant predetermined temperature at the control point in the hearth zone 22. The heat input to the hearth zone 22 and the gas production rate from the hearth zone 22 may be conveniently controlled at a constant level by setting the flow regulators or control devices 24 and 26 so as to feed fuel and oxygen to the hearth zone 22 at a substantially constant rate.

With the foregoing arrangement, if the temperature of the hearth zone 22 rises, the temperature sensing element 41 acting through the detector 42 and the control means 43 causes an increase in the operating speed of the screw conveyor 17 so as to increase the feed rate of ore solids from the reduction column 10 to the hearth zone 22. Because of the increased solids feed rate, the thermal requirements in the hearth zone 22 are increased (1) as a result of the increased amount of iron to be melted in the hearth zone 22, and (2) to an even greater extent as a result of the transfer of a greater proportion of unreduced iron oxide or FeO to the hearth zone 22, the increased proportion of FeO resulting from the decreased residence time of the ore in the reduction column 10. As a result of the increased heat burden on the hearth zone 22, the temperature will thereby be reduced to the desired level. In a similar manner, if the temperature at the control point in the hearth zone 22 drops below the control level, the control system heretofore described will result in a decrease in the rate of transfer of solids from the reduction column 10 to the hearth zone 22 so that the amount of reduced iron to be melted in the hearth zone is decreased and the relative proportion of unreduced FeO in the solids fed to the hearth zone is likewise decreased by reason of the increased residence time of the ore in the reduction column 10. By the above described control system, the chemical requirements and the thermal requirements of the system are always kept in balance and the system continually adjusts itself so as to maintain a maximum rate of production of molten iron with the particular raw materials being fed to the system.

An additional important advantage of the control system of the present invention is found in the fact that it readily accommodates the handling of ore fines in the manner heretofore described. As will readily be appreciated, the ore fines which are entrained in the effluent "spent" reducing gases and which are removed in the cyclone separator 34 comprise for the most part unreduced iron oxide inasmuch as the ore fines obviously have only a rather brief residence time in the reduction column 10. Consequently, the return of ore fines from the hopper 37 through the lines 38 and 19 to the hearth zone 22 tends to place an increased thermal burden on the hearth zone 22 because of the increased amount of FeO which must be reacted with carbon in the hearth zone in the manner previously described. This effect is particularly disturbing to the system if the amount of ore fines charged to the reduction column 10 is subject to fluctuation and if the amount of separated fines charged to the hearth 22 likewise fluctuates. However, with the control scheme described above, the rate of transfer to the hearth zone 22 of the combined ore fines from the line 38 and the ore solids from the reduction column 10 is automatically adjusted to compensate for increased or decreased amounts of unreduced FeO fed to the hearth zone 22 in the form of ore fines. Accordingly, it will be seen that the present control system provides an effective and convenient technique for accommodating the return of ore fines to the system without seriously disturbing the balance between the chemical and thermal requirements of the system.

Although the invention has been described with particular reference to a specific embodiment thereof, it is to be understood that various modifications and equivalents may be resorted to without departing from the scope of the invention as defined in the appended claims.

I claim:

1. In a process for reducing iron oxide ore wherein subdivided ore is contacted in a reducing zone with a reducing gas and wherein effluent solids comprising reduced iron and incompletely reduced iron oxide are discharged from the reducing zone into a hearth zone in which the reduced iron is melted and separated from the gangue of the ore and in which reduction of the iron oxide by reaction with carbon is also effected, the method of controlling the operation of the process which comprises maintaining a substantially constant heat input to the hearth zone, measuring the temperature at a control point which is responsive to the temperature of the molten metal in the hearth zone, and regulating the transfer rate of solids from the reducing zone to the hearth zone to maintain the temperature at said control point substantially constant.

2. In a process for reducing iron oxide ore wherein subdivided ore is contacted in a reducing zone with a reducing gas and wherein effluent solids comprising reduced iron and incompletely reduced iron oxide are discharged from the reducing zone into a hearth zone in which the reduced iron is melted and separated from the gangue of the ore and in which reduction of the iron oxide by endothermic reaction with carbon is also effected, the method of controlling the operation of the process which comprises supplying fuel and oxygen to the hearth zone at substantially constant rates and burning the fuel with the oxygen whereby to maintain a substantially constant heat input to the hearth zone for effecting melting of reduced iron and endothermic reaction of iron oxide with carbon, measuring the temperature at a control point which is responsive to the temperature of the molten metal in the hearth zone, and regulating the transfer rate of effluent solids from the reducing zone to the hearth zone in response to variations in temperature at said control point whereby to change the relative amount of unreduced iron oxide in said effluent solids so as to alter the thermal burden in the hearth zone and thereby maintain the temperature at said control point substantially constant.

3. In a process for reducing iron oxide ore wherein a downwardly moving bed of subdivided ore is contacted in a reducing zone in countercurrent relation with an upwardly flowing stream of reducing gas, wherein effluent solids comprising reduced iron and incompletely reduced iron oxide are discharged from the reducing zone into a hearth zone in which the reduced iron is melted and separated from the gangue of the ore and in which reduction of the iron oxide by reaction with carbon is also effected, and wherein entrained ore fines are separated from the effluent gas from the reducing zone, the method of controlling the operation of the process which comprises maintaining a substantially constant heat input to the hearth zone, measuring the temperature at a control point which is responsive to the temperature of the molten metal in the hearth zone, combining the separated ore fines with said effluent solids, and regulating the transfer rate of the combined ore fines and effluent solids to the hearth zone to maintain the temperature at said control point substantially constant.

4. In a process for reducing iron oxide ore wherein a downwardly moving bed of subdivided ore is contacted in a reducing zone in countercurrent relation with an upwardly flowing stream of reducing gas, wherein effluent solids comprising reduced iron and incompletely reduced iron oxide are discharged from the reducing zone into a hearth zone in which the reduced iron is melted and separated from the gangue of the ore and in which reduction of the iron oxide by endothermic reaction with carbon is also effected, and wherein entrained ore fines comprising unreduced iron oxide are separated from the effluent gas from the reducing zone, the method of maintaining a balance between the chemical and thermal requirements of the process which comprises supplying fuel and oxygen to the hearth zone at substantiallly constant rates and burning the fuel with the oxygen whereby to maintain a substantially constant heat input to the hearth zone for effecting melting of reduced iron and endothermic reaction of iron oxide with carbon, measuring the temperature at a control point which is responsive to the temperature of the molten metal in the hearth zone, combining the separated ore fines with said effluent solids, and regulating the transfer rate of the combined ore fines and effluent solids to the hearth zone is responsive to variations in temperature at said control point whereby to change the relative amount of unreduced iron oxide in said combined ore fines and effluent solids so as to alter the thermal burden in the hearth zone and thereby maintain the temperature at said control point substantially constant.

5. In an apparatus for reducing iron oxide ore comprising a reduction vessel wherein subdivided ore is contacted with a reducing gas, and a melting hearth adapted to receive effluent solids comprising reduced iron and incompletely reduced iron oxide from the reduction vessel and wherein the reduced iron is melted and separated from the gangue of the ore and wherein reduction of the iron oxide by reaction with carbon is also effected, the combination of transfer means for controllably transferring effluent solids from the reduction vessel to the melting hearth, temperature measuring means located at a control point which is responsive to the temperature of the molten metal in said hearth, and control means responsive to said temperature measuring means for regulating the operation of said transfer means so as to maintain the temperature at said control point substantially constant.

6. In an apparatus for reducing iron oxide ore comprising a reduction vessel wherein subdivided ore is contacted with a reducing gas, and a melting hearth adapted to receive effluent solids comprising reduced iron and incompletely reduced iron oxide from the reduction vessel and wherein the reduced iron is melted and separated from the gangue of the ore and wherein reduction of the iron oxide by reaction with carbon is also effected, the combination of a feeding device for controllably transferring effluent solids from the reduction vessel to the melting hearth, drive means for operating said feeding device, temperature sensing means located so as to measure the temperature of the molten metal in the hearth, and control means responsive to said temperature sensing means for regulating said drive means whereby to maintain the temperature of the molten metal in the hearth substantially constant.

7. In an apparatus for reducing iron oxide ore comprising a reduction vessel wherein subdivided ore is contacted with a reducing gas, a melting hearth adapted to receive effluent solids comprising reduced iron and incompletely reduced iron oxide from the reduction vessel and wherein the reduced iron is melted and separated from the gangue of the ore and wherein reduction of the iron oxide by reaction with carbon is also effected, and means for separating ore fines from the effluent gas from the reduction vessel, the combination of means for combining separated ore fines with said effluent solids, transfer means for controllably transferring the combined ore fines and effluent solids to the melting hearth, temperature measuring means located at a control point which is responsive to the temperature of the molten metal in said hearth, and control means responsive to said temperature measuring means for regulating the operation of said transfer means so as to maintain the temperature at said control point substantially constant.

8. In an apparatus for reducing iron oxide ore comprising a reduction vessel wherein subdivided ore is contacted with a reducing gas, a melting hearth adapted to receive effluent solids comprising reduced iron and incompletely reduced iron oxide from the reduction vessel and wherein the reduced iron is melted and separated from the gangue of the ore and wherein reduction of the iron oxide by reaction with carbon is also effected, and means for separating ore fines from the effluent gas from the reduction vessel, the combination of means for combining separated ore fines with said effluent solids, a feeding device for controllably transferring the combined ore fines and effluent solids to the melting hearth, drive means for operating said feeding device, temperature sensing means located so as to measure the temperature of the molten metal in the hearth, and control means responsive to said temperature sensing means for regulating said drive means whereby to maintain the temperature of the molten metal in the hearth substantially constant.

References Cited in the file of this patent

UNITED STATES PATENTS

| | | |
|---|---|---|
| 1,683,809 | Schofield | Sept. 11, 1928 |
| 1,815,899 | Brassert | July 28, 1931 |
| 1,934,082 | Moll et al. | Nov. 7, 1933 |
| 2,107,980 | Elian | Feb. 8, 1938 |
| 2,182,009 | Wiberg | Dec. 5, 1939 |
| 2,404,461 | Sanford | July 23, 1946 |
| 2,500,553 | Lykken | Mar. 14, 1950 |
| 2,739,800 | Sisco | Mar. 27, 1956 |
| 2,750,277 | Marshall | June 12, 1956 |
| 2,782,022 | Strohmeier | Feb. 19, 1957 |